UNITED STATES PATENT OFFICE.

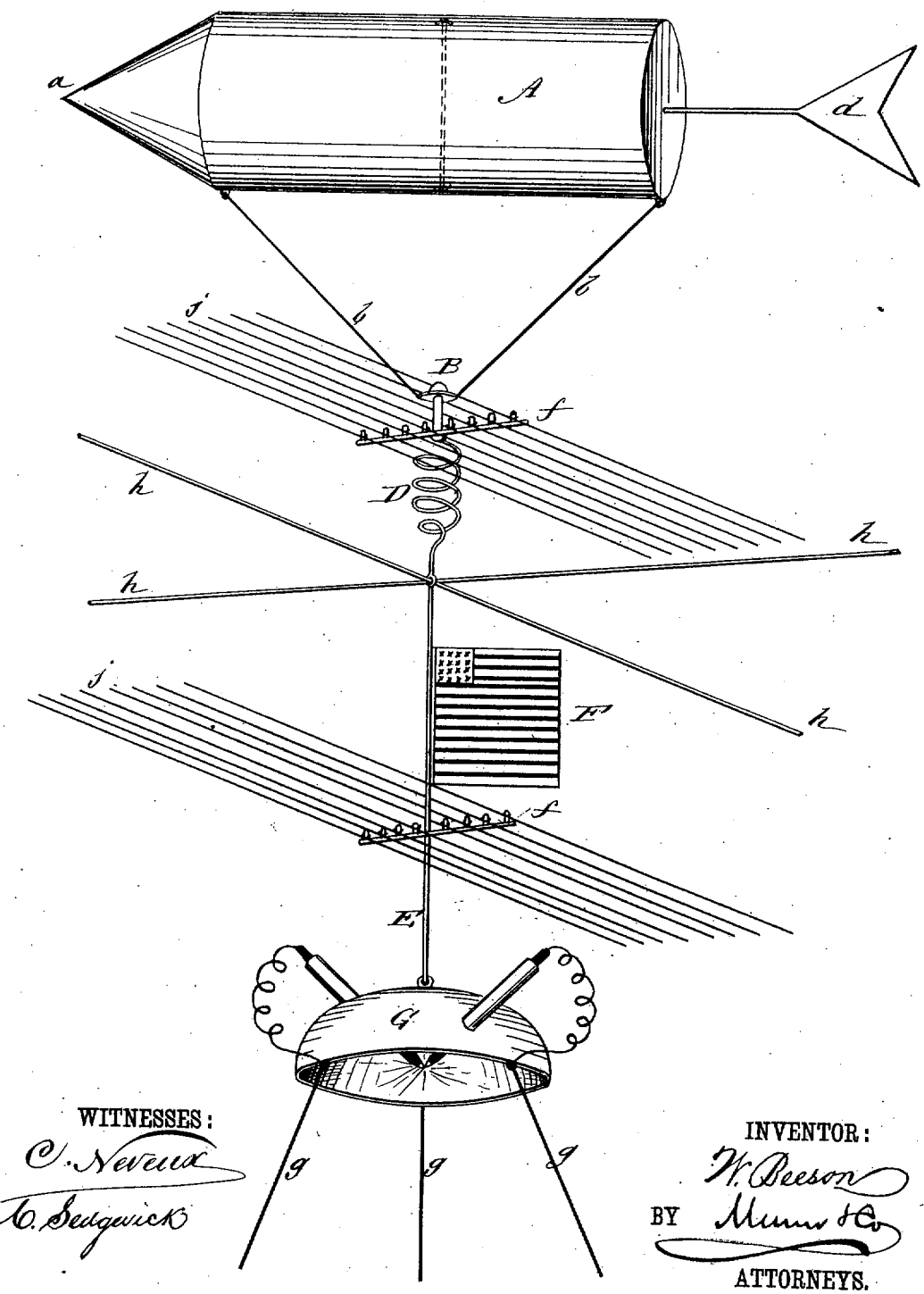

WILLIAM BEESON, OF MILES CITY, MONTANA TERRITORY.

BALLOON-SUPPORT FOR TELEGRAPH-WIRES, &c.

SPECIFICATION forming part of Letters Patent No. 258,005, dated May 16, 1882.

Application filed December 17, 1881. (No model.)

*To all whom it may concern:*

Be it known that I, WILLIAM BEESON, of Miles City, in the county of Custer and Territory of Montana, have invented a new and useful Improvement in Balloon-Floats, of which the following is a full, clear, and exact description.

The object of my invention is to provide an efficient substitute for light-house towers, poles for electric lights, flag-staffs, telegraph-poles, &c., and especially to overcome the necessity of attaching telegraph-wires to buildings in cities and cumbering streets and thoroughfares with telegraph-poles or other similar supports; and to this end my invention consists in supporting the telegraph-wires, electric lights, flags, &c., by means of a gas-inflated metallic chamber or receptacle of sufficient size and buoyancy to float and sustain in mid-air the objects mentioned, the metallic chamber or float being held by suitable stay wires or ropes leading to the ground or to some objects resting thereon, like buildings, trees, or posts.

Reference is to be had to the accompanying drawing, forming part of this specification, in which the figure represents in perspective my invention and illustrating the various uses to which it may be applied.

The float or balloon A is made of metal, and is pointed at one end, as shown at $a$, and provided with the vane or wing $d$ at the other, and is inflated with gas. The gas is filled into the float or balloon at a pressure near enough to maximum pressure to make the balloon free from all danger of bursting, and, as the gas contracts with any lowering of the temperature, provision is made for the sides of the balloon to flatten, and to expand again with the expansion of the gas with any rise in temperature; and the balloon will be covered with paint, asbestus cloth, or other suitable material to protect the gas from extremes in temperature.

The float or balloon is attached by means of the wires $b\ b$ to the head B, which permits the balloon to turn with the changing of the wind, so that the point thereof, or end of least resistance, will always stand to windward, and thus reduce as much as possible the strain upon the main stay wires or ropes leading to the ground.

To the lower end of the head B is attached the coiled spring D, which serves to ease the stays of any sudden and strong upward impetus of the balloon or float during strong winds or storms. To the lower end of this spring is attached the rod or wire rope E, to which may be attached the cross-heads $f\!f$ for holding the telegraph-wire $j\ j$; or this rod may be used to float the flag F or to hold the electric lamp G.

In case the lamp G is used the stay ropes, rods, or wires $g\ g$ may be attached to the lamp, as shown; but if no lamp is to be used the said stays may be connected directly with the rod E, or with the head B, or to any other thing of suitable strength attached to the float.

The wires $h\ h$ represent cross telegraph or electric-light wires.

The spring D may be a separate spring, or may be made a part of the rod or wire E.

My invention will also be particularly useful in holding telegraph-wires passing over rivers, where poles cannot be used.

Having thus described my invention, I claim as new and desire to secure by Letters Patent—

1. The combination, with the float A, of the wires $b$, the head B, and the rod E, substantially as and for the purpose set forth.

2. In combination with the float A, the head B, spring D, rod E, and the stay rods or wires $g\ g$, substantially as and for the purposes set forth.

3. The rod E, carrying the cross-pieces $f\!f$, and provided with the spring D and head B, in combination with the float A and stays $g\ g$, as and for the purposes set forth.

WILLIAM BEESON.

Witnesses:
AL. WARD,
G. O. PERRY.